United States Patent
Dillion, Jr.

[11] Patent Number: 6,010,102
[45] Date of Patent: Jan. 4, 2000

[54] MULTIPLANE BRACKET

[75] Inventor: James L. Dillion, Jr., Grand Prairie, Tex.

[73] Assignee: HighwayMaster Communications, Inc., Dallas, Tex.

[21] Appl. No.: 08/899,833

[22] Filed: Jul. 24, 1997

[51] Int. Cl.[7] ................................................ A45D 42/14
[52] U.S. Cl. ........................................................ 248/206.3
[58] Field of Search ............................. 248/206.3, 206.2, 248/206.4, 205.5, 205.6, 205.7, 309.3, 206.1, 207, 220.1, 288.31, 289.11, 441.1, 479

[56] References Cited

U.S. PATENT DOCUMENTS

| | | | |
|---|---|---|---|
| 2,642,244 | 6/1953 | Beach, Jr. | 248/479 |
| 2,980,379 | 4/1961 | Goldfus | 248/206 |
| 4,325,143 | 4/1982 | Kerr | 455/89 |
| 4,836,482 | 6/1989 | Sokol | 248/206.3 |
| 4,863,130 | 9/1989 | Marks, Jr. | 248/206.3 |
| 5,016,850 | 5/1991 | Plahn | 248/206.3 |
| 5,020,754 | 6/1991 | Davis et al. | 248/206.3 |
| 5,042,418 | 8/1991 | Hoover et al. | 116/173 |
| 5,137,238 | 8/1992 | Hutten | 248/206.3 |
| 5,313,337 | 5/1994 | Byers | 248/206.3 |
| 5,339,551 | 8/1994 | Elmer | 40/591 |
| 5,435,511 | 7/1995 | Hsu | 248/206.3 |
| 5,678,793 | 10/1997 | Hill | 248/309.3 |
| 5,695,164 | 12/1997 | Hartmann et al. | 248/206.4 |

*Primary Examiner*—Ramon O. Ramirez
*Attorney, Agent, or Firm*—Baker & Botts, L.L.P.

[57] ABSTRACT

A mounting system (10) for restraining device (16) within the dashboard and windshield area of a vehicle is provided. Mounting system (10) may include multiplane bracket (20), first support system (40) connected to multiplane bracket (20), second support system (42) connected to multiplane bracket (20), and coupling system (44) connecting device (16) to multiplane bracket (20). Multiplane bracket (20) includes first plane member (24) connected to second plane member (22) by link member (26). First plane member (24) is typically associated with the windshield of the vehicle and second plane member (22) is typically associated with the dashboard of the vehicle. Mounting system (10) provides a contact point to react the load from device (16) at both the windshield and the dashboard, thereby allowing mounting system (10) to restrain heavy devices (16).

23 Claims, 1 Drawing Sheet

MULTIPLANE BRACKET

BACKGROUND OF THE INVENTION

Numerous applications exist in which a mounting system is required to restrain a device. One such application is the mounting of a device or display in or around the viewing area of a vehicle, such as a car, truck, airplane, or train. Typically, the viewing area of a vehicle is a windshield with a dashboard forming a lower boundary of the viewing area and a roof forming an upper boundary of the viewing area. A myriad of devices may be mounted in the viewing area of a vehicle, such as a compass, note pad, radar detector, two-way radio, directional display, or any other device suitable for mounting in or around the viewing area of a vehicle.

Existing techniques of mounting or restraining a device within the viewing area of a vehicle generally include a bracket that attaches to either the windshield, the dashboard, or the ceiling of the vehicle. One such method uses vacuum devices, typically suction cups, to mount the bracket to the windshield. The device is then attached to the bracket, thereby restraining the device to the windshield. Examples of the vacuum device mounting technique are disclosed in U.S. Pat. No. 5,016,850, entitled Article Holding Bracket, granted to Katherine C. Plahn; U.S. Pat. No. 4,836,482, entitled Hinged Support Bracket for a Radar Detector or Like Device, granted to Steven Sokol; and U.S. Pat. No. 5,020,754, entitled Method and Apparatus for Mounting Radar Detector, granted to Gregg M. Davis. This mounting technique suffers from numerous disadvantages. One such disadvantage is that the suction cups connected to the windshield cannot support a heavy load, thereby limiting the size and weight of devices that can be mounted by suction cups. Another disadvantage is that suction cups are prone to failure from the motion of the vehicle, and when the suction cups fail, the device drops to the dashboard, possibly damaging the device.

Another existing technique of mounting or restraining a device includes attaching a bracket to the dashboard or ceiling with an adhesive, such as double backed tape. In many cases the adhesive may not be directly connected between the bracket and the dashboard or ceiling, but includes a hook and loop type material, such as VELCRO™, that allows the device to be removed and reattached. This mounting technique also suffers from numerous disadvantages. One such disadvantage is that the adhesive will often melt or degrade due to environmental conditions, such as temperature and sunlight. Another disadvantage is that the adhesive mounting technique does not readily dampen vehicle vibration, but transfers the vibration to the device.

Yet another existing technique of mounting or restraining a device includes fastening a bracket to the dashboard or the ceiling with fasteners, such as screws. This mounting technique suffers from numerous disadvantages. An obvious disadvantage is that the fasteners damage the dashboard or ceiling. Another disadvantage is that the device cannot be readily removed or repositioned. A further disadvantage is that the fastener mounting method directly transfers vibration from the vehicle to the device.

SUMMARY OF THE INVENTION

Accordingly, a need has arisen for an improved mounting system. The present invention provides an improved mounting system that addresses shortcomings of prior mounting systems.

In accordance with the teachings of one aspect of the present invention, a multiplane bracket for restraining a device within a vehicle is provided. The multiplane bracket may include a first plane member connected to a second plane member. The multiplane bracket may also include a link member that connects the first plane member to the second plane member. An inner surface may be defined by the first plane member, and the second plane member. The device to be restrained within the vehicle is connected to the inner surface of the bracket. An outer surface is defined by the first plane member, the second plane member and the link member, and is opposite the inner surface. The outer surface may be associated with the dashboard, the windshield, or a combination of the dashboard and windshield to restrain the device within the vehicle.

In accordance with another aspect of the present invention, a mounting system to restrain a device within a vehicle having a dashboard and a windshield is provided. The mounting system may include a multiplane bracket as describe above, a first support system connected to the outer surface of the first plane member of the multiplane bracket, a second support system connected to the outer surface of the second plane member of the multiplane bracket, and a coupling system that connects the device to the inner surface of the multiplane bracket to restrain the device within the vehicle.

The mounting system first support system often includes a first attachment system wherein the first attachment system attaches the first plane member to either the dashboard or the windshield. The first support system may also include such devices as a non-slip mat or pad to contact and support the mounting system against the dashboard or the windshield, depending upon the orientation of the mounting system.

The mounting system second support system is similar to the first support system and allows the second plane member to contact or attach to the dashboard or the windshield, depending upon the orientation of the mounting system.

The first support system may be used alone to contact or attach the first plane member to the dashboard or the windshield, or the first support system may be used in conjunction with the second support system to contact or attach the second plane member to the dashboard or the windshield. Similarly, the second support system may be used alone or in conjunction with the first support system.

Technical advantages of the present invention include providing a multiplane bracket and mounting system that can support large and heavy devices. Another technical advantage of the present invention is that the multiplane bracket and mounting system allow an operator of the vehicle to remove or reposition the device with little difficulty. A further technical advantage is that no fasteners are used that may damage the vehicle. An additional technical advantage is that vehicle vibrations transferred to the device are reduced. A further technical advantage is that the multiplane bracket and mounting system can be reversed to allow greater flexibility for an operator. Another technical advantage is that the multiplane bracket and mounting system are not substantially impacted by environmental conditions.

Other technical advantages will be readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION

Figure 1:
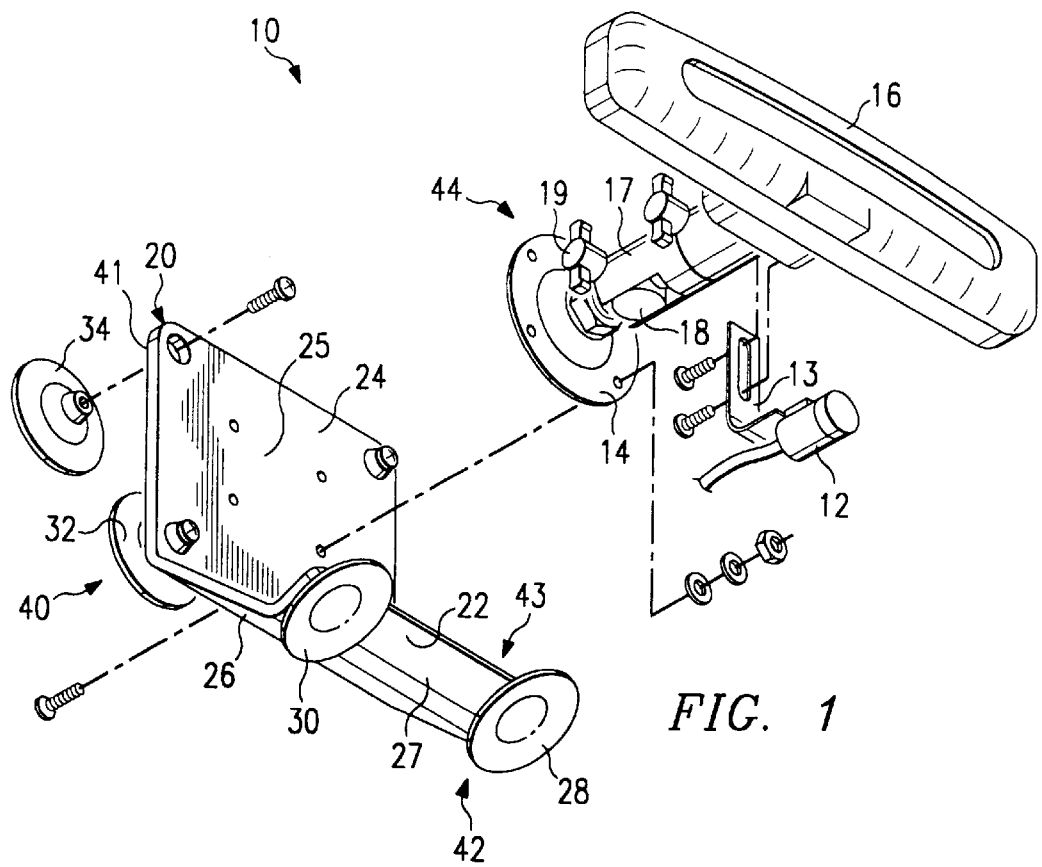
FIG. 1 is an exploded orthographic drawing of a mounting system according to one embodiment of the present invention.
Figure 2:
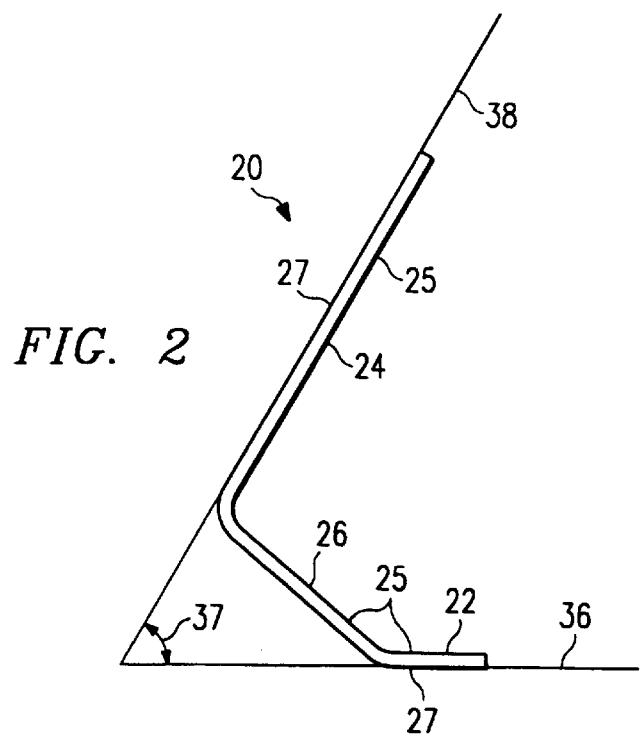
FIG. 2 is cross sectional view of a multiplane bracket as used in the present invention.

The preferred embodiments of the present invention and its advantages are best understood by referring in more detail to FIGS. 1 and 2 of the drawings, in which like numerals refer to like parts throughout the several views.

FIG. 1 illustrates the components and assembly of a mounting system 10 operable to restrain a device 16 within a viewing area of a vehicle. The viewing area of a vehicle typically includes the windshield and dashboard areas of the vehicle, but may include any other area suitable for mounting device 16. Vehicle, as used herein, includes, but is not limited to cars, trucks, airplanes and trains.

Mounting system 10 includes a multiplane bracket 20, a first support system 40 connected to multiplane bracket 20, a second support system 42 connected to multiplane bracket 20, and a coupling system 44 connecting device 16 to multiplane bracket 20.

Multiplane bracket 20 as illustrated in FIGS. 1 and 2 includes a first plane member 24 connected to a second plane member 22. A link member 26 typically connects first plane member 24 to second plane member 22, however, first plane member 24 and second plane member 22 may be directly connected without incorporating link member 26. Link member 26 may be of any size, angle, or configuration that connects first plane member 24 to second plane member 22. An inner surface 25 may be defined by first plane member 24, second plane member 22, and link member 26. An outer surface 27 may be defined by first plane member 24, second plane member 22, link member 26, and opposite inner surface 25. Although first plane member 24 is illustrated as having a longer length than second plane member 22, it is anticipated that the length of first plane member 24 may be the same or less than the length of second plane member 22 without departing from the spirit and scope of the present invention.

As illustrated in FIG. 2, a first plane 38 is associated with first plane member 24. A second plane 36 is associated with second plane member 22. First plane 38 and second plane 36 intersect and form an angle 37. Angle 37 may be in the range of 40 to 80 degrees, and an angle 37 of approximately 60 degrees has been found to be particularly effective.

First support system 40 is connected to the outer surface 27 of first plane member 24. In one embodiment, first support system 40 includes any device or system that may allow first plane member 24 to contact the windshield or dashboard of a vehicle, such as a pad or non-slip mat. In another embodiment, first support system 40 may include a first attachment system 41 that includes any method or device for securably attaching first plane member 24 to the windshield or dashboard of a vehicle. For example, first attachment system 41 may include one or more vacuum devices, as illustrated in FIG. 1 by suction cups 32 and 34. First attachment system 41 may also be an adhesive, such as a double backed type, or an adhesive in combination with a hook and loop type material, such as VELCRO™.

Second support system 42 is connected to the outer surface 27 of second plane member 22 and includes any device or system that may allow second plane member 24 to contact the windshield or dashboard of a vehicle, such as a pad or non-slip mat. Second support system 42 may include a second attachment system 43 that includes any method or device for securably attaching second plane member 22 to the windshield or dashboard of a vehicle. For example, second attachment system 43 may include one or more vacuum devices, as illustrated in FIG. 1 by suction cups 28 and 30. Second attachment system 43 may also be an adhesive, such as double backed tape, or an adhesive in combination with a hook and loop type material, such as VELCRO™.

Coupling system 44 may be any device or system that connects device 16 to the inner surface 25 of multiplane bracket 20. Typically, coupling system 44 will be attached to multiplane bracket 20 at first plane member 24 as illustrated in FIG. 1; however, coupling system 44 may be attached to multiplane bracket 20 at any location on inner surface 25, including second plane member 22, or link member 26. Coupling system 44 may include a plate 14 for attachment to multiplane bracket 20. Plate 14 may be coupled to a ball socket 18. Ball socket 18 allows device 16 to be positioned by an operator of the vehicle. A locking mechanism 19 may be provided to lock ball socket 18 in the position set by the operator of the vehicle. An extension member 17 may be coupled between ball socket 18 and device 16 to aid in the positioning of device 16 by the operator.

Device 16 may be any number of devices, such as an electronic informational display, radar detector, radio, communication system, compass, note pad, or any other device suitable for mounting on or around the viewing area of a vehicle. Device 16 as illustrated in FIG. 1 shows device 16 as an electronic communication system that includes a microphone 12 attached to device 16 by a microphone bracket 13.

In operation, mounting system 10 may contact the dashboard, the windshield, or both the dashboard and the windshield. Mounting system 10 is typically attached such that first plane member 24 is associated with the windshield of a vehicle, as illustrated by suction cups 32 and 34. Second plane member 22 is associated with the dashboard of a vehicle, as illustrated by suction cups 28 and 30. Attachment of mounting system 10 at both the windshield and the dashboard reacts the load created by device 16, thereby increasing the size and weight of device 16 that can be supported by mounting system 10. In addition, mounting system 10 reduces the vibration from the vehicle that is transmitted to device 16. Tests have shown that mounting system 10 reduces the vibration transmitted to device 16 by 25%.

Mounting system 10 may also be reversed to allow first plane member 24 to be associated with the dashboard, such that first support system 40 may contact or attach to the dashboard of the vehicle. Thus, second plane member 22 becomes associated with the windshield, such that second support system 42 may contact or attach to the windshield of the vehicle. Device 16 is typically connected to multiplane bracket 20 at second plane member 22 or at link member 26.

This reversed configuration allows mounting system 10 to restrain device 16 without the need for mounting system 10 to be attached to either the dashboard or the windshield of the vehicle. The mounting system 10 and device 16 assembly essentially sits on the dashboard and is restrained from moving by friction between mounting system 10 and the dashboard and/or windshield.

Although the present invention and its advantages have been described in detail, it should be understood that various changes, substitutions, and alterations can be made therein without departing from the spirit and scope of the present invention as defined by the appended claims.

What is claimed claim is:

1. A multiplane bracket for restraining a device within a vehicle having a dashboard and a windshield, the multiplane bracket comprising:
   a first plane member adapted to be substantially coplanar with the windshield;
   a second plane member adapted to be substantially coplanar with the dashboard;
   an inner surface defined by the first plane member and the second plane member, the inner surface adapted to attach to a coupling system for the device; and
   an outer surface defined by the first plane member and the second plane member, and opposite the inner surface, the outer surface adapted to couple to the windshield and the dashboard of the vehicle to restrain the device within the vehicle.

2. The multiplane bracket of claim 1, further comprising a link member disposed between the first plane member and the second plane member, the link member having an inner surface and an outer surface.

3. The multiplane bracket of claim 1, further comprising:
   a first length associated with the first plane member;
   a second length associated with the second plane member; and
   the first length greater than the second length.

4. The multiplane bracket of claim 1, further comprising:
   a first plane associated with the first plane member;
   a second plane associated with the second plane member; and
   the intersection of the first plane and the second plane forming an angle, wherein the angle is in the range of 40 to 80 degrees.

5. The multiplane bracket of claim 4, wherein the angle is approximately 60 degrees.

6. A mounting system to restrain a device within a vehicle having a dashboard and a windshield, the mounting system comprising:
   a multiplane bracket comprising:
      a first plane member adapted to be substantially coplanar with the dashboard;
      a second plane member adapted to be substantially coplanar with the windshield;
      a link member connecting the first plane member to the second plane member;
      an inner surface defined by the first plane member, the second plane member, and the link member; and
      an outer surface defined by the first plane member, the second plane member, and the link member, and opposite the inner surface;
   a first support system connected to the outer surface of the first plane member and adapted to contact the dashboard of the vehicle; and
   a second support system connected to the outer surface of the second plane member and adapted to contact the windshield of the vehicle; and
   wherein the inner surface of the multiplane bracket is adapted to attach to a coupling system for the device to restrain the device within the vehicle.

7. The mounting system of claim 6, wherein the first support system comprises a pad.

8. The mounting system of claim 6, wherein the first support system comprises a first attachment system.

9. The mounting system of claim 8, wherein the first attachment system comprises at least one suction device.

10. The mounting system of claim 6, wherein the second support system comprises a pad.

11. The mounting system of claim 6, wherein the second support system comprises a second attachment system.

12. The mounting system of claim 11, wherein the second attachment system comprises at least one suction device.

13. The mounting system of claim 6, wherein the coupling system comprises in part a ball joint.

14. The mounting system of claim 6, wherein the mounting system operates to reduce a vibration between the vehicle and the device.

15. The mounting system of claim 6, wherein the coupling system is connected to the inner surface of the second plane member.

16. The mounting system of claim 6, further comprising:
   a first plane associated with the first plane member;
   a second plane associated with the second plane member; and
   the first plane and the second plane intersecting at an angle between 40 and 80 degrees.

17. The mounting system of claim 6, wherein the coupling system is connected to the inner surface of the first plane member.

18. A mounting system for restraining a device within a vehicle having a dashboard and a windshield, the mounting system comprising:
   a multiplane bracket having a first portion adapted to be substantially coplanar with the dashboard and a second portion adapted to be substantially coplanar with the windshield, the multiplane bracket adapted to couple to the windshield and the dashboard of the vehicle and to attach to a coupling system for the device to restrain the device within the vehicle.

19. The mounting system of claim 18, wherein the multiplane bracket comprises:
   a first plane member;
   a second plane member;
   a link member connecting the first plane member to the second plane member;
   an inner surface defined in part by the first plane member, the second plane member, and the link member;
   an outer surface defined in part by the first plane member, the second plane member, and the link member, and opposite the inner surface; and
   wherein the inner surface of the multiplane bracket is adapted to attach to a coupling system for the device.

20. The mounting system of claim 19, further comprising a coupling system, the coupling system comprising:
   a plate connected to the inner surface of the multiplane bracket;
   a ball socket connected to the plate; and
   an extension member coupled to the ball socket and adapted to couple to the device.

21. The mounting system of claim 20, wherein the device is a communications system.

22. The mounting system of claim 19, further comprising:
   a microphone bracket; and
   a microphone connected to the microphone bracket.

23. The mounting system of claim 18, wherein the mounting system reduces a vibration between the vehicle and the device.

* * * * *